United States Patent [19]

Clark

[11] Patent Number: 4,469,015

[45] Date of Patent: Sep. 4, 1984

[54] EMERGENCY AND SERVICE BRAKE ACTUATOR

[75] Inventor: James R. Clark, Milford, Mich.

[73] Assignee: Rockwell International Corporation, Pittsburgh, Pa.

[21] Appl. No.: 457,825

[22] Filed: Jan. 13, 1983

[51] Int. Cl.³ ............... F01B 7/20; F15B 21/02; F16J 1/10

[52] U.S. Cl. ........................... 92/63; 92/78; 92/129; 74/110; 188/343; 91/173

[58] Field of Search ............ 92/129, 63, 130 A; 91/173; 188/343; 74/110

[56] References Cited

U.S. PATENT DOCUMENTS

| 2,794,633 | 6/1957 | Delany | 91/173 |
|---|---|---|---|
| 3,295,423 | 1/1967 | Cox, Jr. et al. | 92/63 |
| 3,395,584 | 8/1968 | Cox et al. | 188/343 |

FOREIGN PATENT DOCUMENTS

| 1424536 | 2/1976 | United Kingdom | 188/343 |
|---|---|---|---|
| 146467 | 8/1961 | U.S.S.R. | 91/173 |
| 303805 | 7/1971 | U.S.S.R. | 188/343 |

Primary Examiner—Paul E. Maslousky

[57] ABSTRACT

An improved emergency and service brake actuator for a wedge type brake is of the type which includes a tubular structure extending from the brake and housing an extended end of a stem of the wedge of the brake therein. An emergency brake actuation portion is mounted on the tubular structure and includes an emergency actuation rod extending into the tubular structure. The emergency brake actuation portion is capable of producing axial movement of the emergency actuation rod to cause an end thereof within an interior of the tubular structure to be selectively located at one of a first position toward the brake for emergency actuation of the brake and a second position remote from the brake. The improvement includes a service cylinder mounted on the end of the emergency actuation rod within the interior of the tubular structure and capable of being axially moved therein. A service piston is mounted on the extended end of the stem for sealed movement within the service cylinder. Service hydraulic fluid is introduced to and discharged from the interior of the service cylinder to act on the service piston to produce relative movement therebetween when the emergency actuation rod is in the second position.

5 Claims, 1 Drawing Figure

EMERGENCY AND SERVICE BRAKE ACTUATOR

BACKGROUND OF THE INVENTION

1. Field of the Invention

This invention relates to an emergency and service brake actuator for a wedge type brake and, more specifically, one which utilizes a fail-safe emergency actuation member and is improved to include a service cylinder and piston configuration mounted between the emergency actuation member and the wedge of the brake.

2. Description of the Prior Art

There has heretofore been provided a number of emergency and service hydraulic brake actuators such as those disclosed in U.S. Pat. Nos. 3,232,175; 3,295,423; 3,462,986; and Re. No. 26,432. These actuators all include an emergency brake actuation member which is mounted on a tubular structure which extends from the brake and houses an extended end of the stem of the wedge of the brake therein. A primary cylinder of the emergency actuation member is mounted on the tubular structure and includes a primary piston mounted for sealed movement within the primary cylinder. The primary piston includes a rod which extends from the first side of the piston into the tubular structure to be operably connected to the extended end of the stem. A spring acts on the second side of the primary piston and tends to produce emergency actuation of the brake if it is not opposed by primary hydraulic fluid introduced to the primary cylinder at the first side of the primary piston.

In these combined emergency and service hydraulic brake actuators, the operable connection between the emergency actuation member and the wedge of the brake included a means for introducing sevice hydraulic fluid into the interior of the tubular structure. The service hydraulic fluid would act on the end of the rod and on the end of a stem of the wedge to selectively increase the relative distance therebetween during service actuation of the brake. This configuration required that the tubular structure be designed to withstand service hydraulic fluid pressure and that there be sealing provided to prevent the escape of the service hydraulic fluid into the emergency actuation member or the brake. Specifically, in order to separate the interior of the primary cylinder and the interior of the tubular structure, the rod from the primary piston was required to extend through a common wall therebetween and to be sealed to prevent the passage of hydraulic fluid from either interior into the other. In these prior art devices, the sealing around the rod was provided by one or more O-rings. However, it has been found that the O-ring seals in these and similar actuator configurations have not had the desired life expectancy needed for safe and reliable brake operation. Whether the decreased effectiveness of such seals is due to an inability to maintain proper tolerances for such an installation, the wear of such O-rings due to repeated axial movement of the primary piston rod, or other factors affecting the wear of the O-rings such as the requirement that opposite sides of the O-rings are subjected to different hydraulic fluid pressure levels is not fully known and might vary from configuration to configuration.

It should be noted that the prior art emergency and service actuators of the type described above must utilize similiar hydraulic fluids for both the emergency actuation and the service actuation functions. Since O-rings or other types of seals are made of materials which are selected depending on the type of hydraulic fluid to which they are exposed, if the seals are exposed to the hydraulic fluid from two sources, the same type of hydraulic fluid should be used for both sources. Using one type of hydraulic fluid may not be a problem with combined emergency and service brake actuators in some brake configurations. However, in some installations it is recognized that one type of hydraulic fluid might function well for an emergency actuator while another type of hydraulic fluid would be better utilized for service actuation.

SUMMARY OF THE INVENTION

It is therefor an object of the invention to provide an improved emergency and service brake actuator which is reliable and simple to provide.

It is another object of the invention to provide such a brake actuator which does not require the use of similar hydraulic fluids for both the emergency and service functions.

These and other objects of invention are provided in a preferred embodiment in the form of an improved emergency and service brake actuator for a wedge type brake which includes a tubular structure extending from the brake and housing an extended end of a stem of the wedge of the brake therein. An emergency brake actuation means is mounted on the tubular structure and includes an emergency actuation rod extending into the tubular structure. The emergency brake actuation means is capable of producing axial movement of the emergency actuation rod to cause an end thereof within an interior of the tubular structure to be selectively located at one of a first position towards the brake for emergency actuation of the brake and a second position remote from the brake. The improvement includes a service cylinder mounted on one of the end of the emergency actuation rod and the extended end of the stem. The service cylinder is mounted within the interior of the tubular structure and is capable of being axially moved therein. A service piston is mounted on the other of the end of the emergency actuation rod and the extended end of the stem. The service piston is mounted for sealed movement within the service cylinder. There is means provided for selectively introducing service hydraulic fluid to and discharging service hydraulic fluid from the interior of the service cylinder to act on the service piston to produce relative movement therebetween when the emergency actuation rod is in the second position.

DETAILED DESCRIPTION OF THE PREFERRED EMBODIMENT

Figure 1:
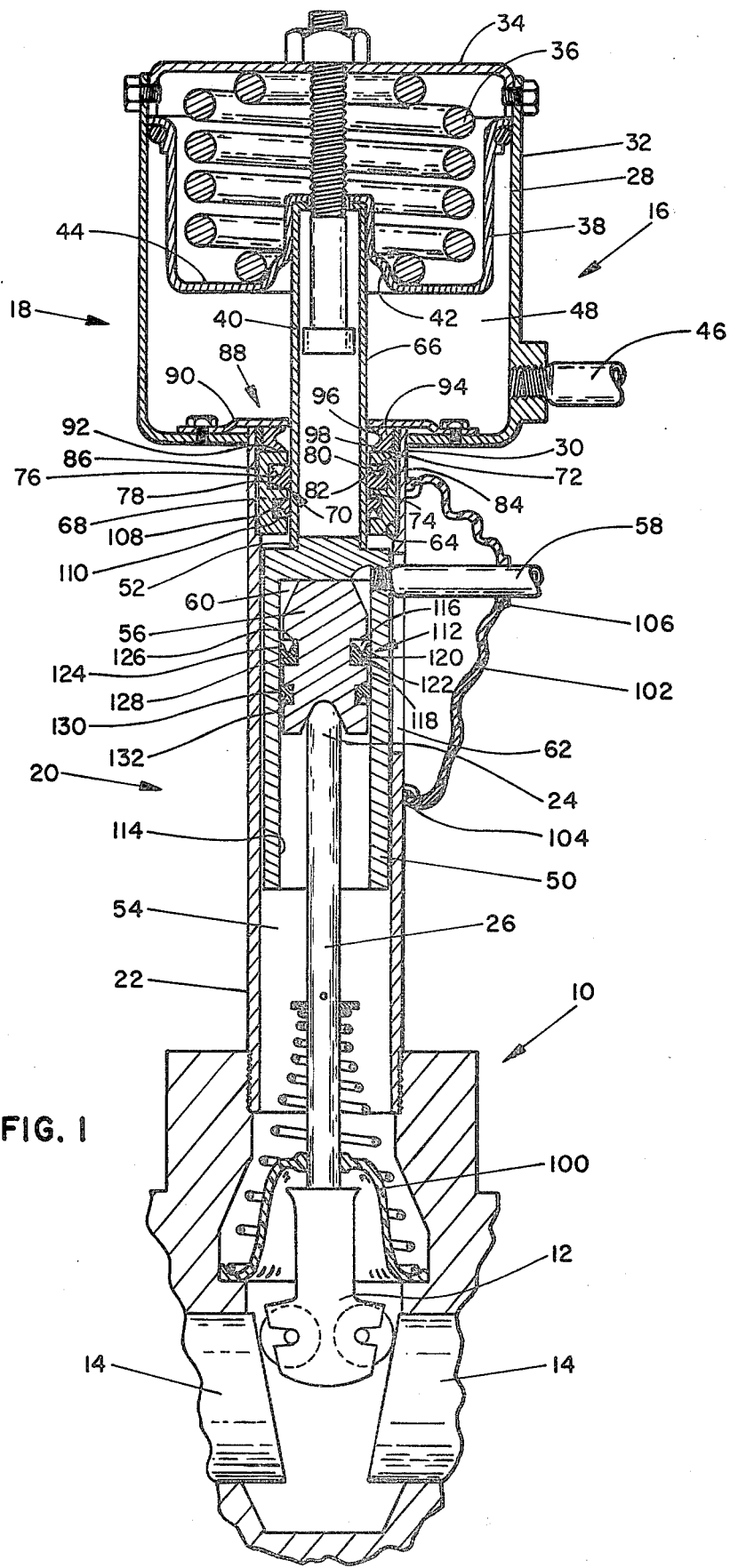
FIG. 1 is a sectional, elevated view of the preferred emergency and service hydraulic brake actuator for a wedge type brake including various features of the invention.

As seen in FIG. 1, a typical wedge type brake 10 includes a wedge 12 which is shown in a position prior to any actuation of the brake. When the brake 10 is actuated by an emergency or service actuation means, the wedge 12 will be caused to move downwardly to act on a pair of plungers 14 to cause their outward movement. The plungers 14 would in turn act on the brake shoes (not shown) to bring them into frictional contact with a rotating brake drum (not shown) to produce frictional braking forces therebetween.

Actuation of the wedge 12 is provided in the preferred improved emergency and service brake actuator 16 by an emergency actuation means 18 or a service actuation means 20. Specifically, a tubular structure 22 extends from the brake 10 to house an extended end 24 of a stem 26 of the wedge 12 therein. The preferred emergency actuation means 18 includes an emergency or primary cylinder 28 mounted on the end 30 of the tubular structure 22. The primary cylinder 28 includes a cylindrical body portion 32 and an end plate 34 which is secured to the cylindrical body portion 32. The end plate 34 supports and the primary cylinder 28 houses a compressed spring 36 which is arranged to provide sufficient force to the wedge 12 to create a braking force on the brake shoes during emergency brake actuation.

However, the emergency actuation means 18 also includes an emergency or primary piston 38 which is mounted for sealed movement within the primary cylinder 28. A rod 40 is secured to and extends from a first side 42 of the primary piston 38 into the tubular structure 22 to be operably connected to the extended end 24 of the stem 26 in a manner which will be discussed herein below. Accordingly, the spring 36 acts as a biasing means to apply braking force to a second side 44 of the primary piston 38 and is capable, if unopposed, of moving the primary piston 38 from the position as shown in FIG. 1 to a lower position within the primary cylinder 28 to produce emergency actuation of the brake.

Of course, during normal operation of the vehicle, emergency brake actuation is not desired. Therefore, to oppose the force created by spring 36, there is provided a means for selectively introducing primary hydraulic fluid to the primary cylinder 28 at the first side 42 of the primary piston 38 to cause movement thereof in opposition to the spring 36. As seen in FIG. 1, primary hydraulic fluid has been supplied to the primary cylinder 28 to cause the piston 38 to be positioned as shown within the primary cylinder 28 to prevent actuation of the brake by the spring 36. A hydraulic line 46 is utilized to introduce the primary hydraulic fluid into the interior 48 of the primary cylinder 28 or to discharge primary hydraulic fluid from the interior 48 of the primary cylinder 28 to selectively cause movement of the piston 38 within the primary cylinder 28 in opposition to the spring 36 to prevent actuation of the brake or allow actuation of the brake by the spring 36. The fluid line 46 is preferably connected to a system such as those shown in the prior art patents mentioned hereinabove and thus includes a fail safe feature so that a loss of primary hydraulic fluid will evacuate the interior 48 of the primary cylinder 28 to allow actuation of the brake by the spring 36.

To provide the service actuation means 20, the preferred embodiment includes a service cylinder 50 which is mounted on an end 52 of the rod 40. It should be understood that this mounting need not be rigid since it might be desirable to allow some means for self-alignment therebetween. The service cylinder 50 is mounted within the interior 54 of the tubular structure 22 and is capable of being axially moved therein. Additionally, the service actuation means 20 includes a service piston 56 which is operably connected to the end 24 of the stem 26 and is mounted for sealed movement within the service cylinder 50. A hydraulic line 58 is included as a means for selectively introducing service hydraulic fluid to and discharging service hydraulic fluid from an interior 60 of the service cylinder 50. The service hydraulic fluid acts on the service piston 56 to produce relative movement between the cylinder 50 and the piston 56 when the emergency actuation means 18 is not being utilized and the rod 40 is in the position as shown in FIG. 1. The control of service hydraulic fluid into and out of line 58 is preferably provided by a system such as those shown in the prior art patents mentioned hereinabove. It might be desirable to include a means for preventing the introduction of service hydraulic fluid to the interior 60 of the service cylinder 50 if the emergency brake feature is being utilized and the spring 36 has caused a repositioning of the piston 38 toward the brake 10. However, there are some wedge type brakes which include members with sufficient strength and integrity to allow the emergency actuation means 18 to be energized to actuate the brake while still allowing service hydraulic fluid to be introduced to the interior 60 of the cylinder 50 without any damage to the brake. The additional force created by service actuation would create an additional but unnecessary braking force on the brake, but would not be harmful to the brake since it would not cause any damage thereto.

As mentioned hereinabove, the service cylinder 50 is mounted within the interior 54 of the tubular structure 22 and is capable of being axially moved therein. Therefore, when the emergency actuation means 18 is energized, movement of the end 52 of the rod 40 toward the brake 10 would cause corresponding movement of the service cylinder 50 and service piston 56 therein within the interior 54 of the tubular structure 22. To accommodate this movement, the tubular structure 22 is provided an axially extending, elongated slot 62 in a side thereof. With the hydraulic line 58 extending from the service cylinder 50 through the slot 62, the service cylinder 50 is capable of freely moving within the interior 54 of the tubular structure 22 in response to movement of the rod 40 with the emergency actuation means 18.

As thus explained, the preferred emergency and service brake actuator 16 includes major components which are arranged to provide the basic emergency and service actuation. However, there are a number of other features of the emergency and service actuator 16 which are preferable to insure that the actuator is reliable and relatively simple to provide.

For proper and safe operation of the emergency actuation means 18, it is essential to include a means for preventing the loss of primary hydraulic fluid from the primary cylinder 28 through an annular space between an interior surface 64 of the tubular structure 22 and an exterior surface 66 of the rod 40. In the preferred actuator 16, this is primarily accomplished by including a floating seal carrier 68 which surrounds the rod 40 and supports a sealing means 70 which extends inwardly to make sealing contact with the exterior surface 66. The sealing means 70 preferably includes a lip seal and is provided a circumferential groove 72 around an interior surface 74 of the carrier 68. The lip seal includes a U-shaped expandable seal 76 seated against an end wall 78 of the groove 72 remote from the primary piston 38. The expandable seal 76 has a first lip 80 which makes sliding, sealing contact with the exterior surface 66 of the rod 40 and a second lip 82 which makes sealing contact with a base 84 of the circumferential groove 72. The floating seal carrier 68 has an advantage of requiring a minimum number of manufacturing tolerances to effectively provide sealing around the exterior surface 66 of the rod 40. Specifically, the more critical manufacturing tolerances need only be provided to the exterior surface 66 of the rod 40, the interior surface 74 of the carrier 68, and the base 84 of the circumferential groove 72. It will be noted that the floating seal carrier 68 does not prevent the passage of primary hydraulic fluid between its exterior surface 86 and the interior surface 64 of the tubular structure 22. In fact, although the space therebetween shown in FIG. 1 is slightly exaggerated, it is desirable that the carrier be allowed, as its name implies, to float as it surrounds the rod 40. In other words, there is no need to provide critical manufacturing tolerances for the exterior surface 86 of the carrier 68 or the interior surface 64 of the tubular structure 22 or any critical matching of eccentricities therebetween. Instead, it is preferable for the floating carrier 68 to be provided sufficient clearance to be able to remain naturally aligned with and centered about the rod 40 for effective sealing about its exterior surface 66.

To prevent the passage of primary hydraulic fluid between the floating seal carrier 68 and the interior surface 64 of the tubular structure 22, a mechanical face seal 88 is provided. The mechanical face seal 88 is disposed between an inwardly extending carrier retainer ring 90 which is mounted at the end 30 of the tubular structure 22 toward the primary cylinder 28 and an end 92 of the floating seal carrier 68 adjacent to the primary cylinder 28. The mechanical face seal 88 preferably includes an expandable seal 94 which has a U-shaped cross section and includes a first lip 96 and a second lip 98 which extend generally inwardly toward the rod 40 to respectively make sealing contact with the retaining ring 90 and the end 92 of the floating seal carrier 68. Obviously, there are other types of mechanical face seals which could be utilized for this purpose, but it is significant to note that a seal of the type described is capable of effectively preventing the passage of primary hydraulic fluid between the floating seal carrier 68 and the interior surface 64 of the tubular structure 22 without the requirement of any critical manufacturing tolerances.

For the preferred actuation means 18, the floating seal carrier 68 with a U-shaped expandable seal 76 and a mechanical face seal with an expandable seal 94 are particularly attractive because the interior 48 of the primary cylinder 28 will be periodically subjected to primary hydraulic fluid under pressure while the interior 54 of the tubular structure 22 will be exposed to the environment and atmospheric pressure. Because of the preferred service actuation means 20, the tubular structure 22 is not subjected to nor sealed to withstand service hydraulic fluid pressure and is therefore capable of being exposed to dirt and contamination from the environment. Specifically, grease, braking material, and dust could enter the interior 54 of the tubular structure 22 through the flexible seal 100 of the brake 10 which surrounds the stem 26. Additionally, because of the slot 62, a flexible sealing element 102 has a first end 104 which surrounds the slot 62 and a second end 106 which surround the hydraulic line 58 to restrict entrance of dirt and contamination into the interior 54 of the tubular structure 22. Nevertheless, there will be dirt and contamination within the interior 54 of the tubular structure 22 even though there would be a greater quantity were it not for the seal 100 and the flexible sealing element 102.

Since the rod 40 will periodically be axially moved within the interior of the carrier 68, there is some concern that dirt and contamination on the exterior surface 66 of the rod 40 would affect and interfere with the life and operation of the expandable seal 76. Accordingly, the floating seal carrier 68 is provided a wiper ring 108 adjacent the interior 54 of the tubular structure 22 for removing dirt and contamination from the exterior surface 66 of the rod 40. Although the wiper ring 108 is preferably installed in a circumferential groove 110 in the interior surface 74 of the floating seal carrier 68, there are any number of arrangements for providing such a wiper ring which could be alternatively employed.

Although there was no discussion hereinabove of sealing for the service actuation means of the prior art actuators described in the patents mentioned above, a similar concern for hydraulic sealing and dirt and contamination exists for the service piston 56 within the service cylinder 50. Specifically, the service piston 56 includes lip sealing means 112 which extend outwardly to make sealing contact with an interior surface 114 of the service cylinder 50. The service piston 56 preferably includes a circumferential groove 116 around an exterior surface 118 thereof. The preferred lip seal means 112 includes a U-shaped expandable seal 120 which is seated against an end wall 122 of the circumferential groove 116 remote from the interior 60 of the service cylinder 50. The expandable seal 120 has a first lip 124 making sliding, sealing contact with the interior surface 114 of the service cylinder 50 and a second lip 126 making sealing contact with a base 128 of the circumferential groove 116. Again, because the interior 54 of the tubular structure 22 is exposed to the environment, the service piston 56 is provided a wiper ring 130 remote from the interior 60 of the service cylinder 50 for removing dirt and contamination from the interior surface 114 of the service cylinder 50. Although the wiper ring 130 is installed in a circumferential groove 132 in the exterior surface 118 of the service piston 56, other configurations could be utilized for mounting and supporting one of any number of alternative types of wiper ring elements.

Although as discussed hereinabove, the preferred emergency and service brake actuator 16 could be utilized in a hydraulic system like one of those which is disclosed in the patents mentioned above, the present invention includes features which increase the flexibility and alternatives available to one designing a brake control system. Specifically, the present emergency and service brake actuator no longer includes an arrangement wherein the primary hydrualic fluid and service hydraulic fluid will both be exposed to a common sealing element. Clearly, primary hydraulic fluid will be retained within the interior 48 of the primary cylinder 28 and service hydraulic fluid will be retained within the interior 60 of the service cylinder 50. Accordingly, the seals needed to prevent the escape of hydraulic fluid from either of these sources are sufficiently remote from the other so that the sealing material selected can be specifically designed to accommodate the particular type of hydraulic fluid that is considered most desirable. As a result, it is quite possible that the two hydraulic systems can be designed to be completely separate so that the installation could be designed to include a particular type of hydraulic fluid for the primary hydraulic fluid which is significantly different than that chosen for the service hydraulic fluid. For example, it would be possible to provide primary hydraulic fluid which is pressurized and contained within a power steering system and totally independent from the service actuation system. At the same time, a conventional service actuation braking system could be utilized to employ hydraulic fluid which is considered desirable for this purpose.

It should be clear that any number of alternatives could be made to the preferred embodiment of the invention without departing from the scope of the invention as claimed. For example, it would be possible to mount the service cylinder on the extended end of the stem and to mount the service piston on the end of the emergency actuation rod while still providing the service actuation function as described above.

I claim:

1. An improved emergency and service brake actuator for a wedge type brake of the type which includes a tubular structure connected to and extending from a housing of said brake to include an extended end of a stem of said wedge of said brake therein, an emergency brake actuation means mounted on said tubular structure and including an emergency actuation rod extending into said tubular structure, said emergency brake actuation means being capable of producing axial movement of said emergency actuation rod to cause an end thereof within an interior of said tubular structure to be selectively located at one of a first position toward said brake for emergency actuation of said brake and a second position remote from said brake, and means for controlling said service brake actuator with service hydraulic fluid from a service brake actuation system, wherein said improvement comprises:

a service cylinder mounted on one of said end of said emergency actuation rod and said extended end of said stem;

said service cylinder being mounted within said interior of said tubular structure and capable of axial movement therein;

a service piston mounted on the other of said end of said emergency actuation rod and said extended end of said stem;

said service piston being mounted for sealed movement within said service cylinder;

means for coupling said service cylinder to said service brake actuation system for selective introduction of said service hydraulic fluid to and discharge of said service hydraulic fluid from an interior of said service cylinder to act on a pressure end of said service piston to produce relative movement therebetween when said emergency actuation rod is in said second position;

said tubular structure including an axially extending elongated slot in a side thereof; and said means for coupling said service cylinder to said service brake actuation system including a hydraulic line extending from said service cylinder through said slot to allow said axial movement of said service cylinder within said interior of said tubular structure.

2. The improved emergency and service brake actuator set forth in claim 1, wherein said service piston supports a lip seal means axially near said pressure end thereof with said lip seal means extending outwardly to make sealing contact with an interior surface of said service cylinder.

3. The improved emergency and service brake actuator as set forth in claim 2, wherein said interior of said tubular structure is exposed to the environment and said service piston includes a wiper ring axially remote from said pressure end of said service piston with said lip seal means therebetween for removing dirt and contamination from said interior surface of said service cylinder.

4. The improved emergency and service brake actuator as set forth in claim 3, further including a flexible sealing element having a first end surrounding said slot and a second end surrounding said hydraulic line to restrict entrance of said dirt and contaimination into said interior of said tubular structure.

5. The improved emergency and service brake actuator as set forth in claim 2, wherein said service piston includes a circumferential groove around an exterior surface thereof, said lip seal means includes a U-shaped expandable seal which is seated against an end wall of said circumferential groove remote from said interior of said service cylinder and has a first lip making sliding, sealing contact with said interior surface of said service cylinder and a second lip making sealing contact with a base of said circumferential groove.

* * * * *